United States Patent [19]

Daouse

[11] Patent Number: 5,603,965
[45] Date of Patent: Feb. 18, 1997

[54] APPARATUS FOR CO-DISTRIBUTING CONFECTION PRODUCTS

[75] Inventor: Alain Daouse, Noailles, France

[73] Assignee: Nestec S.A., Vevey, Switzerland

[21] Appl. No.: 146,937

[22] Filed: Nov. 3, 1993

[30] Foreign Application Priority Data

Nov. 28, 1992 [EP] European Pat. Off. ........... 92120369.1

[51] Int. Cl.$^6$ .................................................. B29C 47/06
[52] U.S. Cl. ...................... 425/130; 156/500; 425/131.1; 425/377; 425/381; 425/382 R; 425/382.3
[58] Field of Search ..................... 426/512, 515, 426/516; 264/173, 103, 73, 173.11; 425/382 N, 382.3, 381, 380, 381.2, 130, 131.1, 377; 156/500

[56] References Cited

U.S. PATENT DOCUMENTS

| | | | |
|---|---|---|---|
| 559,323 | 4/1896 | Drake | 425/381 |
| 1,389,517 | 8/1921 | Kitsee | 264/103 |
| 1,714,234 | 5/1929 | Ost | 425/381 |
| 2,046,541 | 7/1936 | Becker | 425/381 |
| 2,171,095 | 8/1939 | Orsini | 425/381 |
| 2,405,057 | 7/1946 | Rosenstein et al. | 264/103 |
| 2,545,869 | 3/1951 | Bailey | 264/103 |
| 2,770,835 | 11/1956 | Williams | 264/103 |
| 2,919,467 | 1/1960 | Mercer | 425/381 |
| 3,591,892 | 7/1971 | Fairbanks | 425/381 |
| 3,613,161 | 10/1971 | Fairbanks | 425/381 |
| 3,981,951 | 9/1976 | Richman | 264/73 |
| 4,060,361 | 11/1977 | Ziolko | 425/381 |
| 4,184,613 | 1/1980 | Kinney | 222/145 |
| 4,835,000 | 5/1989 | Kehoe | 426/516 |
| 4,851,247 | 7/1989 | Greenhouse et al. | 426/516 |
| 4,913,645 | 5/1990 | Daouse et al. | 425/150 |
| 4,923,706 | 5/1990 | Binley et al. | 426/516 |
| 4,948,611 | 8/1990 | Cummins | 426/516 |
| 5,059,375 | 10/1991 | Lindsay | 264/173 |
| 5,135,767 | 8/1992 | Daouse | 426/515 |

FOREIGN PATENT DOCUMENTS

| | | |
|---|---|---|
| 2055277 | 5/1992 | Canada . |
| 0044689A1 | 1/1982 | European Pat. Off. . |
| 0221757A2 | 5/1987 | European Pat. Off. . |
| 0503254A1 | 9/1992 | European Pat. Off. . |
| 1076117 | 7/1967 | United Kingdom . |

*Primary Examiner*—Jan H. Silbaugh
*Assistant Examiner*—Mark Eashoo
*Attorney, Agent, or Firm*—Vogt & O'Donnell, LLP

[57] ABSTRACT

An apparatus for preparing an article of ice confectionery has two tube assemblies which each have a mobile portion positioned coaxially one to the other. Each mobile portion has a distribution channel which extends to a nozzle delivery end configured in a fishtail shape for depositing material, the mobile portions being positioned and configured so that at least a portion of the distribution channels are separated for thermally isolating the channels and so that upon axial rotation of the mobile portions, material deposited from one nozzle is integrated with material deposited from the other nozzle. The mobile portions may be driven for rotation separately, or one mobile portion may be driven and connected with the other mobile portion for driving the rotation of the other mobile portion.

16 Claims, 3 Drawing Sheets

APPARATUS FOR CO-DISTRIBUTING CONFECTION PRODUCTS

BACKGROUND OF THE INVENTION

The invention relates to the field of cake production, and in particular, to production of cakes of ice confectionery containing integrated decorative layers of crisp material.

European Patent Application Publication No. 44 689 discloses a method and a device for producing cakes of ice confectionery using a rotary joint enabling the continuous extrusion of twisted multi-coloured strands of ice-cream. A device of this type does not enable the simultaneous extrusion of ice cream at a negative temperature and of a composition which becomes hard in contact with the ice cream but which has to be distributed in a liquid form, therefore at a temperature above ambient temperature, as the nozzle would be rapidly blocked.

European Patent Application Publication No. 328 170 discloses a device for decorating cakes of ice confectionery which also uses a rotary joint moved by a programmable automatic device. In an embodiment, the device makes it possible to decorate round cakes with scallops, by acting on the relative rates of flow of ice cream and the speed of rotation of the rotary joint of the distributor. In this case as well, provision is not made for the simultaneous extrusion of a plurality of materials whose behaviour on fusion is very different.

European Patent Application Publication No. 434 857 discloses a system for the simultaneous distribution of ice cream and chocolate which comprises the movement of two streams of ice cream and liquid chocolate, the ice cream taking up the chocolate outside the extrusion nozzles. This system is suited to successive operation in order to fill tubs, cones or pots, with a dwell time during filling, but cannot be used for instance for continuous decoration, since the shapes generated by the movements can be controlled only by the containers receiving the products. Moreover, the mechanism for moving the product distribution tubes is relatively bulky.

European Patent Application No. 485 654 discloses a device distributing alternate layers of chocolate and ice cream into cones or pots which also operates in a successive manner but is of more compact construction than the previous device. This distributor comprises a rotary joint supplying the ice cream vertically in the form of a helical ribbon surrounded by a fixed annular tube from which the chocolate flows and is inserted in the form of strips in the helical ribbon. This device can operate at high speed, while producing a uniform distribution of the layers of chocolate in the ice cream. When it is desired to carry out the continuous extrusion of a decoration using this device, it has to be inclined in order to release the product from the nozzles. Unfortunately, the ice cream then obstructs the chocolate discharge nozzles.

SUMMARY OF THE INVENTION

The present invention provides a means for the continuous production of a decoration based on a crisp composition integrated into the ice cream using a compact distributor with rotary joints which provides a solution to the hardening of the crisp composition in contact with the ice cream.

To produce the confectionery article, use is made of a device comprising two co-axial rotary tube assemblies and a rotary joint in which the respective circuits for supply of a liquid composition, such as a chocolate coating composition, and ice cream are thermally isolated from one another.

The invention therefore relates to a device for producing an article of ice confectionery comprising an integrated decoration of crisp material, characterized in that it comprises two coaxial rotary tube assemblies for an ice cream composition and for a liquid composition and rotary joints and means for rotating the tube assemblies in a same direction, means for the thermal isolation of the distribution channel for the ice cream composition from the distribution channel for the liquid composition and nozzles in the form of fishtails which are substantially parallel or substantially aligned and disposed radially with respect to the axis of rotation of the tube assemblies.

The invention also relates to a method of production of a cake of ice confectionery comprising an integrated decoration of crisp material in which an ice cream composition is simultaneously and continuously extruded at a negative temperature with a liquid composition at a temperature above ambient temperature and the integrated decoration is deposited on a moving support, characterized in that the ice cream composition and the liquid composition are extruded from rotary tubes coaxial with a fishtail nozzle whose axis of rotation is inclined with respect to the support, in that the nozzles are substantially parallel or substantially aligned, are disposed radially with respect to the axis of rotation of the tubes and rotate at the same speed and in that the distribution channels for the ice cream composition and the liquid composition are thermally isolated from one another.

DESCRIPTION OF PREFERRED EMBODIMENTS

According to a first embodiment of the method of the invention, the composite decoration of crisp material and ice cream composition may be extruded directly, for instance onto paper or board supported by a continuously moving conveyor belt. It then forms the cake.

As a function of the relative speeds of rotation of the tubes, movement of the support and rates of flow of the ice cream composition and the liquid composition, it is possible to obtain different decorations fluted to different degrees. If, for instance, the layers of ice cream and chocolate are alternated by distributing one and then the other material alternately on each rotation of the tube assemblies, it is possible to produce a scalloped decoration.

According to a second embodiment of the method, the composite decoration of crisp material and ice cream composition may be extruded, for instance depositing it on a strand of ice cream composition previously disposed on paper or board supported by a continuously moving conveyor belt.

The device of the invention may be positioned with the axis of rotation of the tube assemblies in a vertical position and can be used to fill containers, for instance cones or pots, as they pass by one after the other.

It is preferred, however, to use the device to produce cakes of ice confectionery by disposing the integrated decoration in the form of a continuous strand on a moving conveyor belt; in this case the axis of rotation of the tube assemblies is inclined with respect to the conveyor belt in the direction of forward movement of this belt.

The invention is set out in further detail in the following description made with reference to the accompanying drawings, given by way of example.

BRIEF DESCRIPTION OF THE DRAWING FIGURES

DETAILED DESCRIPTION OF THE DRAWING FIGURES

Figure 1:
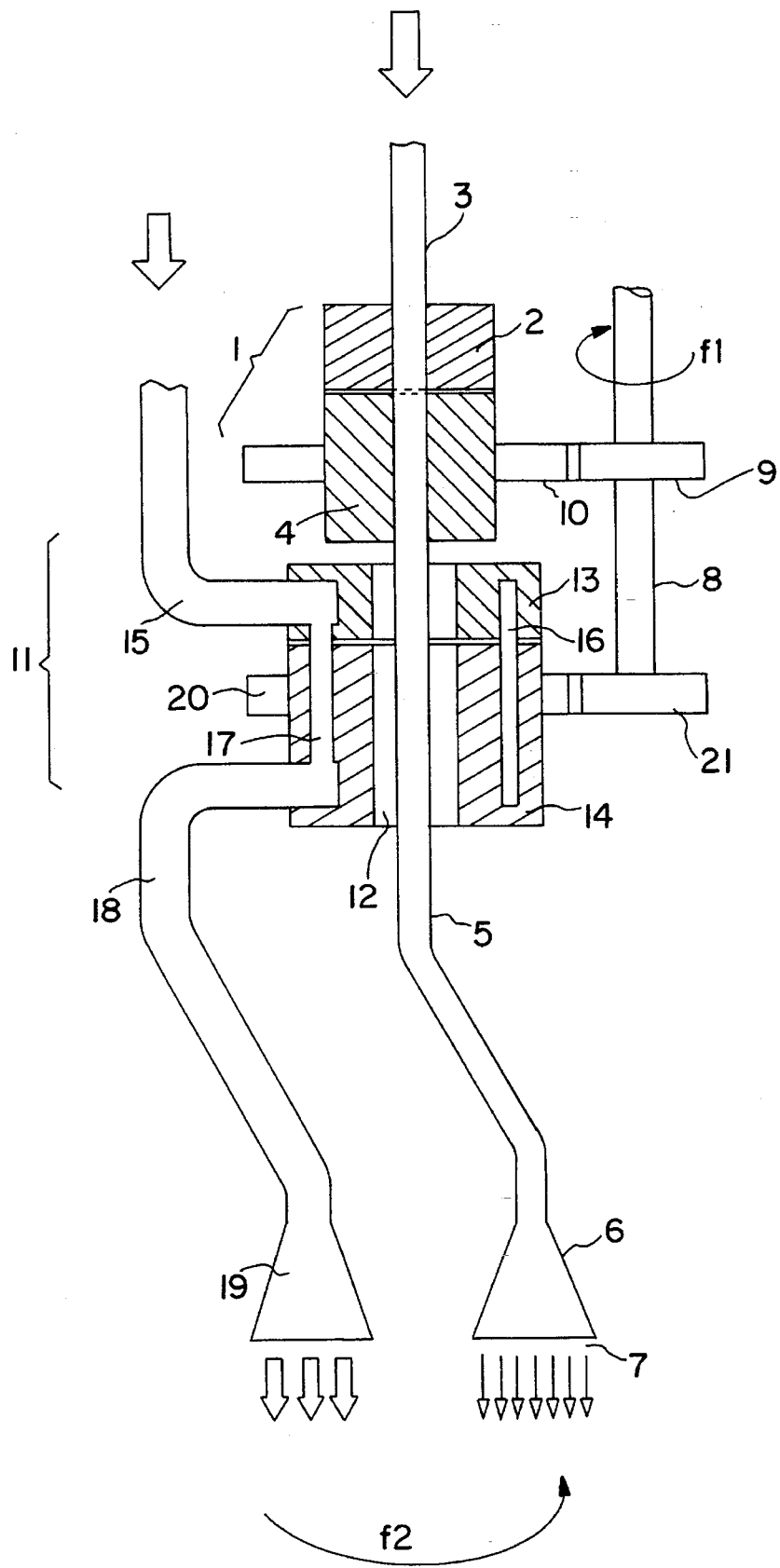
FIG. 1 is a diagrammatic view in longitudinal section of an embodiment of the device of the invention.

In FIG. 1, the device comprises a first rotary tube assembly 1 formed by a fixed portion which is a body 2 of revolution traversed along its longitudinal axis by a duct 3. The fixed portion is associated with a mobile portion formed by a body 4 of revolution to which there is secured a channel 5 whose upper portion is rectilinear and whose lower portion is bent in the shape of an S and ends in a nozzle 6 in the form of a fishtail provided with orifices 7. The nozzle is offset with respect to the axis of rotation of the tube 1 and parallel thereto.

The apparatus forms a rotary joint. The mobile portion of the tube assembly 1 is caused to rotate by means of a shaft 8 to which there is secured a gear 9 engaged on a gear 10 rigid with the body 4. The shaft 8 is driven by a motor (not shown) and rotates in the direction of the arrow f1. The liquid composition, for instance chocolate, passes through the duct 3 and the channel 5 and is distributed via the orifices 7 of the nozzle 6.

A second rotary tube assembly 11 is disposed coaxially about the upper rectilinear portion of the channel 5 and below the body of revolution 4. It comprises, at its centre, a cylindrical recess 12 passing through it from side to side and open to the atmosphere. The tube assembly 11 comprises a fixed portion formed by a body 13 of revolution and a mobile portion formed by a crown 14. A curved duct 15 is fixed radially to the body 13 and opens into an annular groove 16 opening towards the base of the body 13. The crown 14 comprises an annular groove 17 opening upwards opposite the groove 16 of the body 13. The groove 17 opens in turn into a channel 18 which is defined by a tubular member fixed radially to the crown 14, the groove 17 and channel 18 being disposed laterally from channel 5. The tubular member which defines channel 18, which is initially radial, is then bent at right angles and then into the shape of an S and terminates in a fishtail nozzle 19 aligned with respect to the nozzle 6 and symmetrical thereto with respect to the axis of rotation of the tube assemblies.

The apparatus forms a second rotary joint. The crown 14 and therefore also the nozzle 19 of the mobile portion of tube assembly 11 are driven in rotation by means of a gear 20 fixed to the crown 14 and engaged with a gear 21 rigid with the shaft 8, the diameters of the gears 20 and 21 being respectively the same as those of the gears 9 and 10, so that the mobile portions of the tube assemblies rotate at the same speed in the direction of the arrow f2. The ice cream composition is supplied via the duct 15, spreads into the grooves 16 and 17 and then passes through the channel 18 and is continuously discharged via the nozzle 19. In this embodiment, it can be seen that the respective distribution circuits of liquid composition and ice cream composition are isolated from one another by a ring of air.

Figure 2:
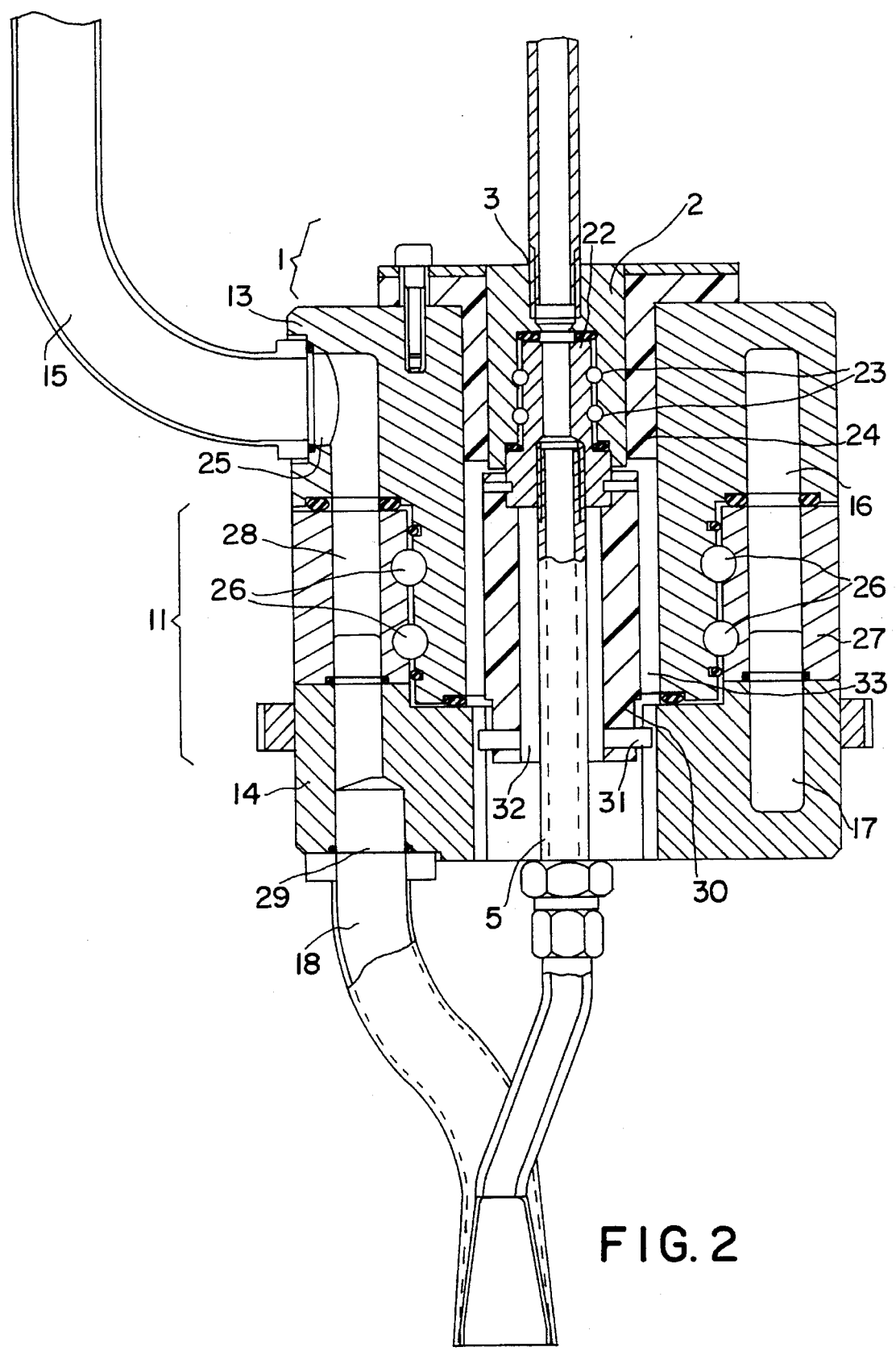
FIG. 2 is a detailed longitudinal section through the extrusion tubes of a preferred embodiment of the device of the invention.

In the preferred embodiment shown in FIG. 2, the extrusion tube assembly for the liquid composition is interlinked with the extrusion tube assembly for the ice cream composition in order to form a compact assembly. In this Figure, the same reference numerals are used for components identical to those of FIG. 1, and as illustrated, each nozzle is offset from the axes of rotation of the first and second nozzle assembly mobile portions.

The tube assembly 1 comprises a central metal hub 22, the duct 3 being fixed to its upper portion and the channel 5 being fixed to its lower portion. The hub 22 rotates freely in the fixed annular body 2 by means of ball bearings 23 held in place by the body 2. The annular component 24, of thermally insulating plastic material, is fixed to the body 2 and surrounds the body 2.

The tube assembly 11 comprises the fixed annular metal body 13 in which the body 2 and the member 24 are secured. The body 13 is provided in its upper thickness with the downwardly open annular groove 16 provided with a lateral opening 25 opposite the duct 15. The lower portion of the body 13 is surrounded by the metal crown 14. The crown 14 comprises a lower portion and an upper portion. It rotates freely on the body 13 by means of ball bearings 26 which are held in place by the upper portion of the crown 14, i.e., the annular member 27. The annular member 27 and the lower portion of the crown 14 are provided with a channel 28. The crown 14 is recessed and comprises an upwardly open annular groove 17 in its lower portion, which groove is connected to the channel 18, which is defined by a tubular member, via the opening 29, the channel 18 and ducts 17 and 16 being disposed laterally from channel 5. The crown 14 is driven in rotation by means of the cylindrical connection 30 of thermally isolating plastic material whose upper portion is secured to the hub 22 while its lower portion is made rigid with the crown 14 by means of keys 31. It can be seen that in this way the channel 5 which is defined by a tubular member is surrounded by, as illustrated, a space which allows the presence of a ring of air 32 in the same way as the connection 30 is surrounded by, as illustrated, a space which allows the presence of a ring of air 33. The liquid composition circuit is thus completely thermally isolated from that of the iced composition without the possibility of thermal bridges being created. Moreover, the fixed portions 2 and 13 and one mobile portion, including the hub 22, connection 30 and the channel 5 defined by the tubular member, and the other mobile portion 14 of the assemblies 1 and 11 are connected together so that it is enough to drive the hub 22 in rotation for both tube assemblies to rotate at the same speed.

Figure 3:
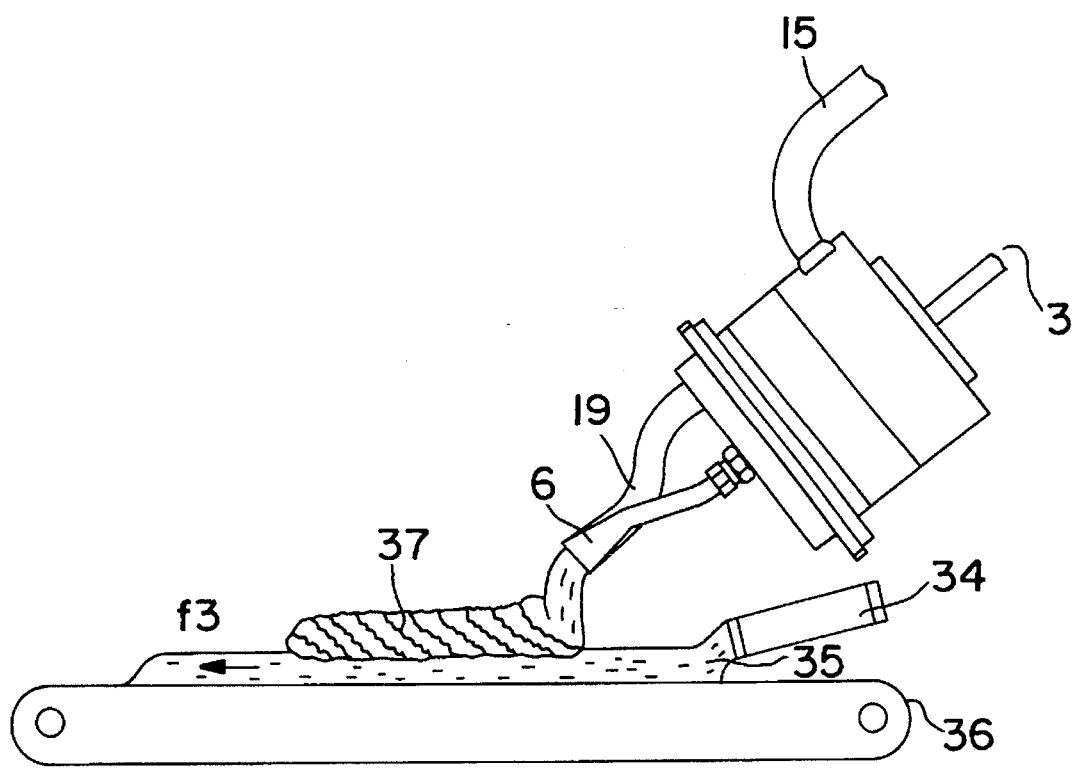
FIG. 3 is a diagrammatic view of the device applying a preferred embodiment of the method of the invention.

In FIG. 3, a fixed nozzle 34 deposits a strand 35 of ice cream composition on a conveyor belt 36 moving in the direction of the arrow f3 on which a sheet of paper or board (not shown) has previously been disposed. The strand 35 acts as a support for a composite decoration 37 comprising chocolate integrated with the ice cream. This decoration is produced by the rotation of the tubes 1 and 11 which are inclined with respect to the conveyor belt in the direction of its movement. In this application of the method, the nozzles 6 and 19 are close to one another and the fishtails substantially parallel.

A decoration folded in spirals is obtained by acting on the rate of flow of the compositions, the speed of rotation of the tubes and the speed of movement of the belt, the uniformity of the decoration being obtained by the fact that a resistance is created between the layers of the decoration 37 and the ice cream support 35. The continuously decorated sausage may then be cut to form a cake.

By means of a valve (not shown) in the case of the ice cream composition and a valve (not shown) in the case of the liquid composition, it is possible to discontinue the supply of the compositions simultaneously when filling a container, for instance with the device of FIG. 1. The supply may be discontinued alternately one out of every two turns when continuously decorating a cake, thereby obtaining an iced cake with a scalloped decoration, for instance with the device of FIG. 2 used according to FIG. 3.

The ice composition of ice confectionery is advantageously an ice cream containing 5–10% by weight of fatty material and 30–45% by weight of dry material, with at least 90% overrun, extruded at a temperature of −5° to −3° C. It will be appreciated that the extrusion parameters depend on the type of ice cream and in particular on its freezing point, the quantity of fatty material and the type of stabilizers.

The liquid composition is advantageously a chocolate coating which is relatively viscous so that it can be discharged at low pressure, for instance at approximately 0.1 to 1 bar with respect to atmospheric pressure, via the orifices of the nozzle 6 at a temperature of approximately 40°–45° C.

The production of ice cream articles containing flakes of chocolate has been described in particular. The above description also applies to the production of a dessert article based on refrigerated mousse, for instance with a base of aerated cream or cheese containing flakes of crisp material.

I claim:

1. An apparatus for preparing an article of ice confectionery comprising:

a first assembly comprising (i) a rotatable mobile portion which is rotatable about an axis, (ii) a tubular member which defines a channel and (iii) a nozzle configured in a fishtail shape, wherein the tubular member is fixed to and extends from the mobile portion and the nozzle extends from the tubular member for distributing a material from the tubular member channel so that upon rotation of the mobile portion about the axis, the tubular member and nozzle are rotated about the axis;

a second assembly comprising (i) a rotatable mobile portion which is positioned for rotation about the axis, (ii) a tubular member which defines a channel and (iii) a nozzle configured in a fishtail shape, wherein the second assembly tubular member is fixed to and extends from the second assembly mobile portion, wherein the second assembly nozzle extends from the second assembly tubular member for distributing a material from the second assembly tubular member channel, and wherein the second assembly mobile portion, tubular member and nozzle are positioned (i) so that the second assembly tubular member is disposed laterally from the first assembly tubular member and so that at least a portion of the second assembly tubular member is separated from the first assembly tubular member for thermally isolating the first and second assembly tubular member channels one from the other and (ii) so that the second assembly nozzle is disposed laterally from the first assembly nozzle and (iii) so that upon rotation of the first and second assembly mobile portions about the axis in a same direction, material distributed from the second assembly nozzle is integrated with material distributed from the first assembly nozzle; and means connected with the first and second assembly mobile portions for rotating the first and second assembly mobile portions so that the first and second assembly mobile portions are rotated about the axis in the same direction.

2. An apparatus according to claim 1 wherein the means for rotating comprises gear means connected with the first assembly mobile portion for rotating the first assembly mobile portion and comprises separate gear means connected with the second assembly mobile portion for rotating the second assembly mobile portion.

3. An apparatus according to claim 1 wherein the means for rotating comprises means for connecting the first and the second assembly mobile portions so that upon rotation of the first assembly mobile portion, the second assembly mobile portion is rotated.

4. An apparatus according to claim 1 wherein the second assembly mobile portion comprises a centrally disposed portion positioned about and displaced a distance away from the axis and the first assembly tubular member for providing a space between the centrally disposed portion and the first assembly tubular member which is open to the atmosphere for providing a ring of air about the first assembly tubular member for isolating the first and second assembly tubular member channels thermally.

5. An apparatus according to claim 1 wherein the means for rotating comprises (i) a gear fixed to the first assembly mobile portion and a drive gear positioned for engaging the first assembly mobile portion fixed gear for rotating the first assembly mobile portion and (ii) a gear fixed to the second assembly mobile portion and a drive gear positioned for engaging the second assembly mobile portion fixed gear for rotating the second assembly mobile portion.

6. An apparatus according to claim 5 wherein the means for rotating further comprises a shaft fixed to each of the drive gears for rotating the drive gears for rotating the first and second assembly mobile portions.

7. An apparatus according to claim 5 wherein the gears fixed to the first and second assembly mobile portions each have a diameter which is the same and wherein the drive gears have a diameter which is the same for rotating the first and second assembly mobile portions, tubular members and nozzles at the same speed.

8. An apparatus according to claim 6 wherein the fixed gears have a diameter which is the same and wherein the drive gears have a diameter which is the same for rotating the first and second assembly mobile portions, tubular members and nozzles at the same speed.

9. An apparatus according to claim 3 wherein the means for rotating comprises a hub connected with the first assembly mobile portion for rotating the first and second assembly mobile portions and wherein the means for connecting the first and second assembly mobile portions is a cylinder member connected to the hub and to the second assembly mobile portion.

10. An apparatus according to claim 9 wherein the cylinder member is comprised of a thermally isolating plastic material.

11. An apparatus according to claim 9 wherein the cylinder member has an inner surface displaced a distance away from the first assembly tubular member for providing a space between the cylinder member inner surface and the first assembly tubular member which is open to the atmosphere for providing a ring of air about the first assembly tubular member for isolating the first and second assembly tubular member channels thermally.

12. An apparatus according to claim 11 wherein the cylinder member is comprised of a thermally isolating plastic.

13. An apparatus according to claim 11 wherein the second assembly mobile portion has a centrally disposed portion positioned about the axis and displaced a distance away from the first assembly tubular member for providing a space between the centrally disposed portion and the first assembly tubular member which is open to the atmosphere for providing a ring of air about the first assembly tubular member for isolating the first and second assembly tubular member channels thermally.

14. An apparatus according to claim 1 wherein the first assembly nozzle is offset from the axis.

15. An apparatus according to claim 1 wherein the first and second assembly nozzles are offset from the axis.

16. An apparatus according to claim 1 further comprising a conveyor belt positioned for receiving material from the nozzles.

* * * * *